Patented Dec. 10, 1940

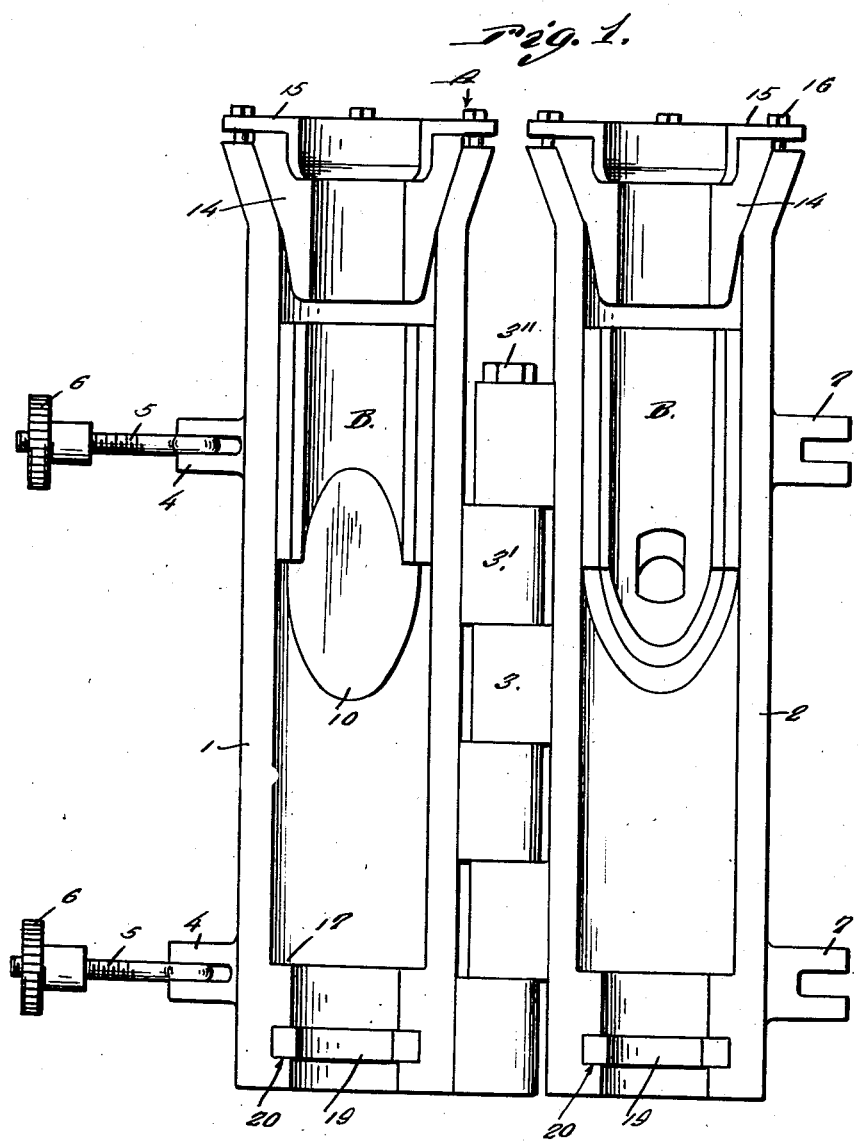

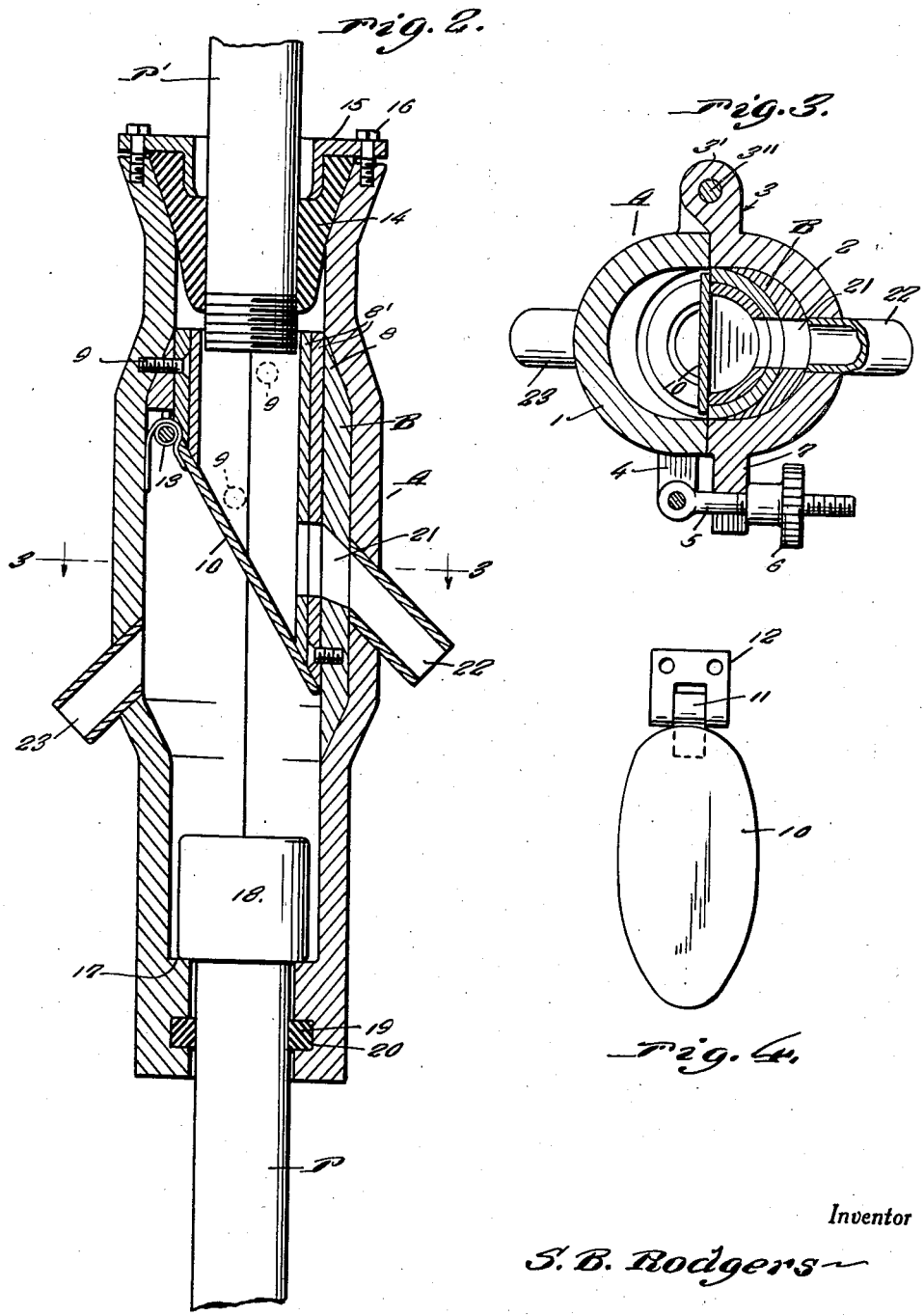

2,224,657

UNITED STATES PATENT OFFICE 2,224,657

FLOW PREVENTING PIPE ELEVATOR

Seymour Bland Rodgers, Kilgore, Tex.

Application December 21, 1939, Serial No. 310,436

3 Claims. (Cl. 166—16)

This invention relates to a flow preventing pipe elevator, the general object of the invention being to provide an attachment used in pulling tubing or piping from wells to prevent waste of liquid from the well by the separation of pipe sections.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a view of the device with the two sections in open position.

Figure 2 is a vertical sectional view through the device attached to a pair of pipe sections and with the sections in separated position.

Figure 3 is a section on the line 3—3 of Figure 2.

Figure 4 is a view of the valve.

In these drawings the letter A indicates a tubular member which is formed of the two sections 1 and 2 which are hingedly connected together at one side edge as shown at 3, the hinge means including overlapping barrels 3' and a hinge pin 3" passing through the barrels. One of the sections at the other side edge is provided with ears 4 between each pair of which is pivoted an eye bolt 5 having a nut 6 thereon, these eye bolts adapted to be positioned between the forked lugs 7 at the free edge of the other section to latch the two sections together around pipe sections P and P' as shown in Figure 2. The tubular member A is formed with an intermediate enlarged part and reduced end portions and a bushing B fits in the enlarged part, said bushing being formed of the large outer portion 8 and the two inner portions 8' suitably secured together and secured to the large part of the bushing B by the screws 9. This bushing has its lower end beveled to form a beveled valve seat for a flap valve 10 which is of substantially oblong form as shown in Figure 4. One end of this valve is hinged as at 11 to a bracket 12 which is fastened to the short side of the bushing and a spring 13 on the hinge part acts to hold the valve 10 in closed position or resting on the seat formed by the bushing, as shown in Figure 2. The enlarged part of the tubular member A is of such a length relative to the valve 10 that said valve, when opened, can rest against an interior side portion of the tubular member with the pipe sections passing through the tubular member, when said sections are connected together. A packing member 14 of rubber or the like fits in the flaring upper end of the tubular member and is held in place by a flanged plate 15 fastened to the upper end of the tubular member by the screw 16, this packing means forming a pipe joint between the upper end of the member A and the upper pipe section P'. In the lower part of the tubular member a shoulder 17 is formed by the reduced lower part which forms a seat for the coupling 18 at the other end of the section P and a gasket 19 is placed in a groove 20 in the lower end of the tubular part for forming a pipe joint between the device and the section P. A port 21 is formed in the lower side of the bushing B and a downwardly and outwardly sloping vent pipe 22 is carried by an intermediate portion of the member A and communicates with said port, the port being located above the valve seat and a similar outlet nipple or pipe 23 is connected with the opposite side of the member A and is in communication with that part of the member below the valve seat. Of course and as shown in Figures 1 and 3 all the parts excepting the valve 10 are formed in half sections and are located in the sections 1 and 2 of the tubular member so that all the parts will be formed in half sections when the device is open as shown in Figure 1. If desired or necessary a gasket may be placed between the sections 1 and 2 to provide a tight joint when the sections are closed.

When a pipe line is to be pulled or elevated the device is placed around that joint of two sections of the line which are to be separated, that is, the joint 18 between the sections P and P'. The placing of the two sections around the line will open the valve 10 against the spring 13. The two sections 1 and 2 are tightly fitted around the two pipe sections by the bolts 5 and nuts 6 and then the section P' is unscrewed from the coupling 18 and as the section P is pulled upwardly the parts assume the position shown in Figure 2 and the valve closes as soon as it clears the coupling 18 as the device is moved upwardly to place the shoulder 17 against the coupling 18. The closing valve 10 then cuts off the flow of fluid from the well into the upper portion of the pipe line and this fluid will flow through the outlet nipple 23 to which a hose or other tubular member is connected, to a tank or other container and the fluid flowing down through the disconnected upper section will pass through the port 21 and the nipple 22 through a tubular member to the tank or other point where the fluid is to be caught.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A flow preventing pipe elevator comprising a tubular member formed of sections for positioning around a pipe joint where a fluid line is to be separated and the upper portion of the line raised, a valve in the tubular member held in open position by the part of the line passing through the device, means for closing the valve when the joint is separated, said valve separating the tubular member into upper and lower parts, the lower part being in communication with the lower portion of the pipe line and the upper portion in communication with the upper part of the pipe line and drain means leading from the two portions of the tubular member one above the valve and the other below the valve.

2. A flow preventing pipe elevator comprising a tubular member formed of sections, means for hinging the sections together at one edge, latch means at the other edges for latching the member around a joint of a pipe line, said tubular member having an intermediate enlarged part, a bushing in the enlarged part having its lower end beveled and forming a valve seat, a spring actuated flap valve pivoted to the bushing and the spring of which normally holds the valve on the seat, the valve being pressed against the portion of the enlarged part when the two sections are placed around the joint of the line and latched together, the valve closing when the line is separated at the joint and the upper section moves upwardly, drain means in communication with the tubular member above the valve, drain means in communication with the tubular member below the valve and gaskets for forming tight joints between the tubular member and the pipe sections.

3. A flow preventing device for well tubing comprising a sectional tubular member, means for holding the sections around a joint of a flow line, valve means in the tubular member normally held in open position when the device is placed around the joint but closing to divide the tubular member into upper and lower parts when the pipe sections are disconnected at the joint and separated, a nipple in communication with the tubular member above the valve, a nipple in communication with the tubular member below the valve, said nipples draining fluid from the tubular member above and below the valve.

SEYMOUR BLAND RODGERS.